Dec. 25, 1923.  1,478,437
S. KAPLAN ET AL
WHEEL FOR AUTOMOBILES
Filed Oct. 10, 1921   4 Sheets-Sheet 2
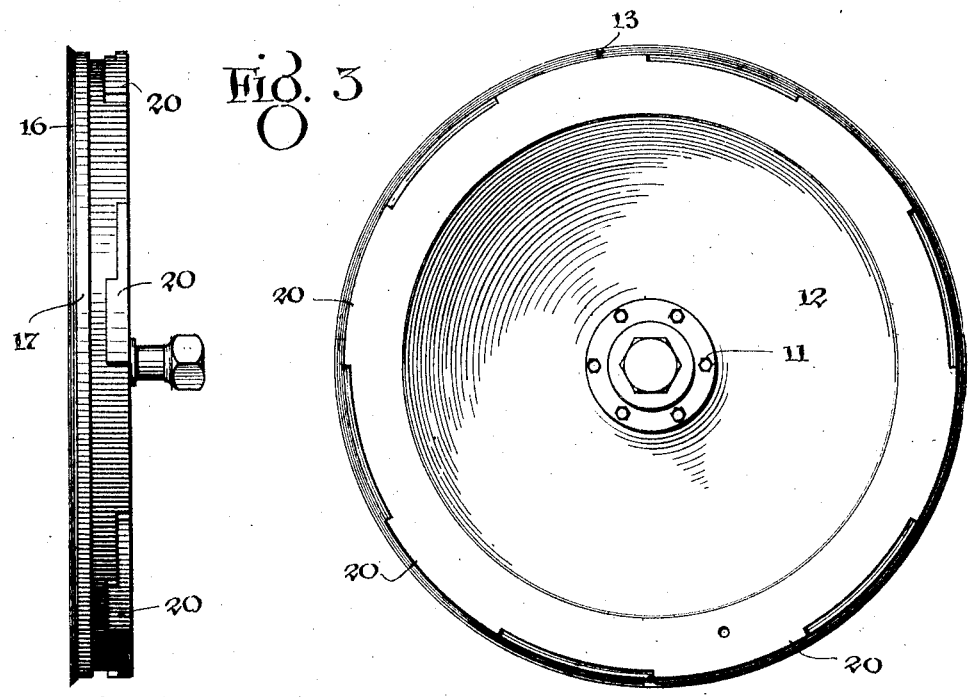
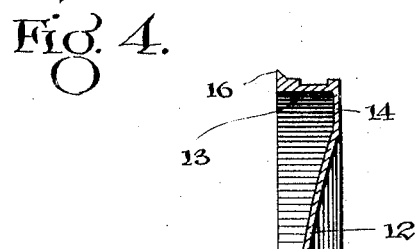
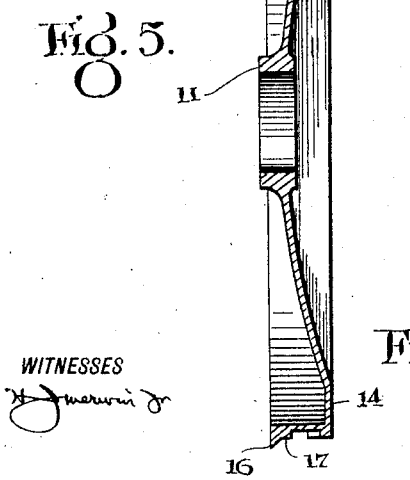
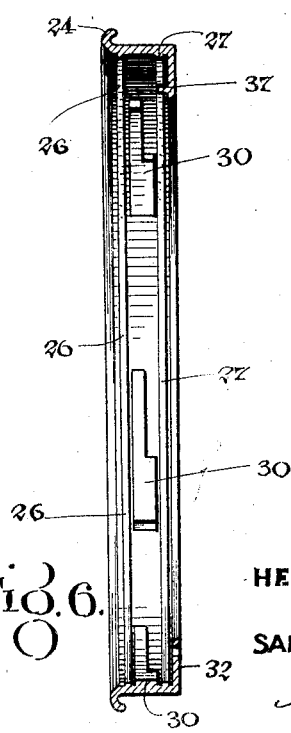
HENRY M. HOWELL.
SAMUEL KAPLAN.
INVENTOR Dec. 25, 1923.    1,478,437
S. KAPLAN ET AL
WHEEL FOR AUTOMOBILES
Filed Oct. 10, 1921     4 Sheets-Sheet 3
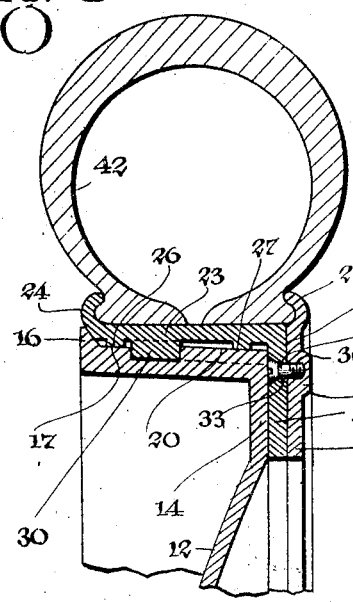
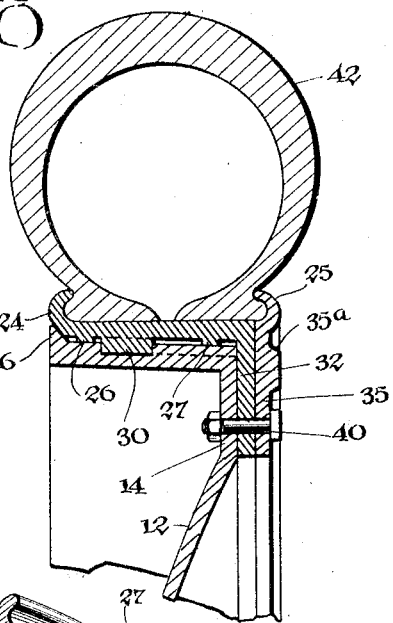
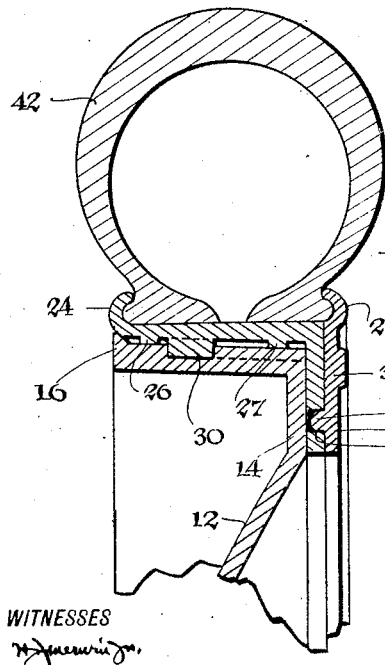
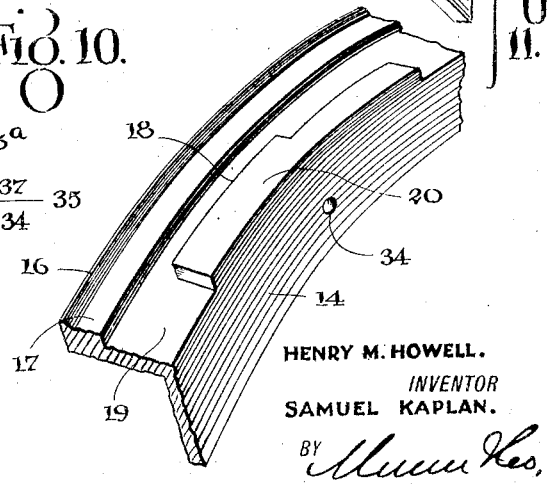
INVENTOR
SAMUEL KAPLAN.
ATTORNEYS

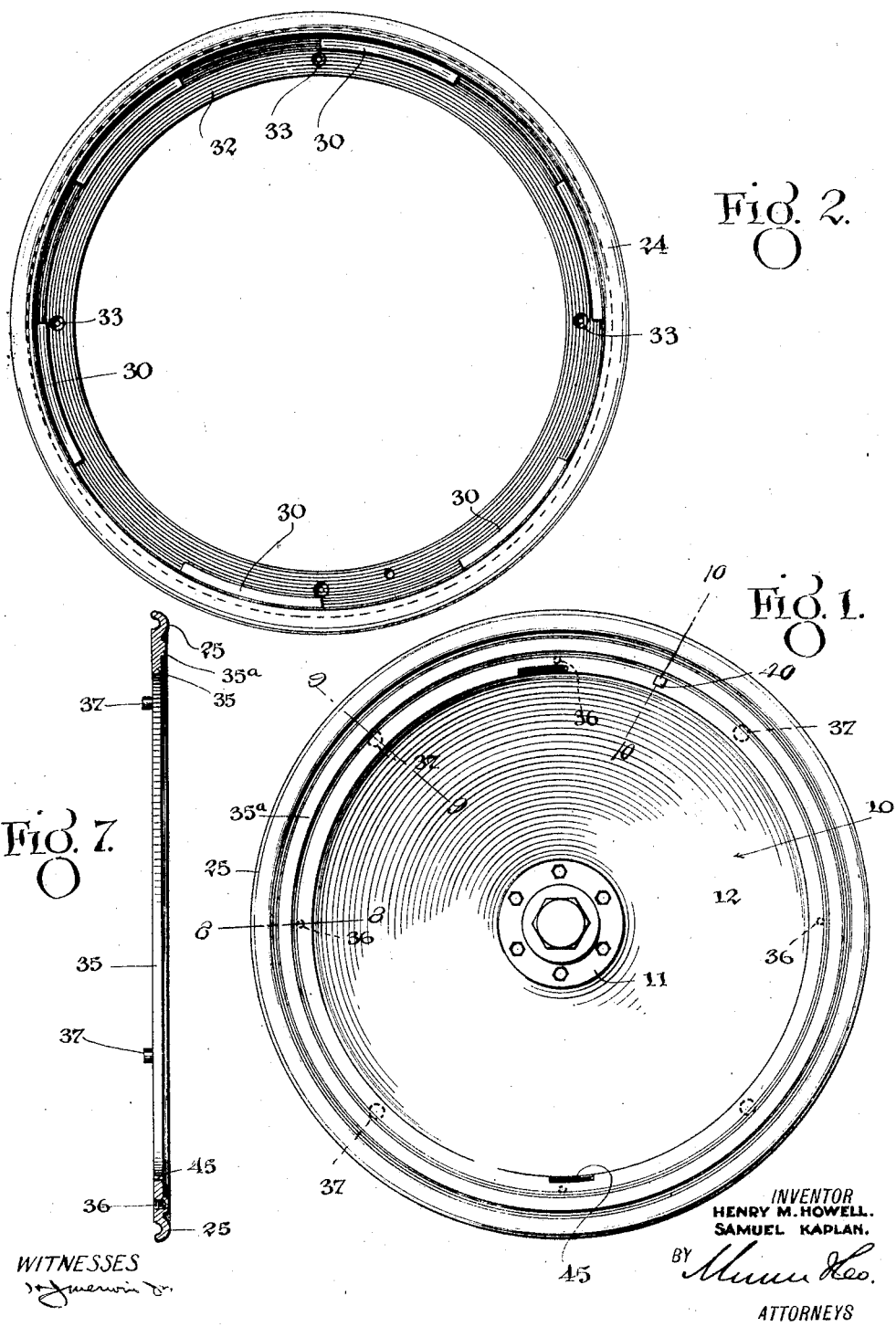

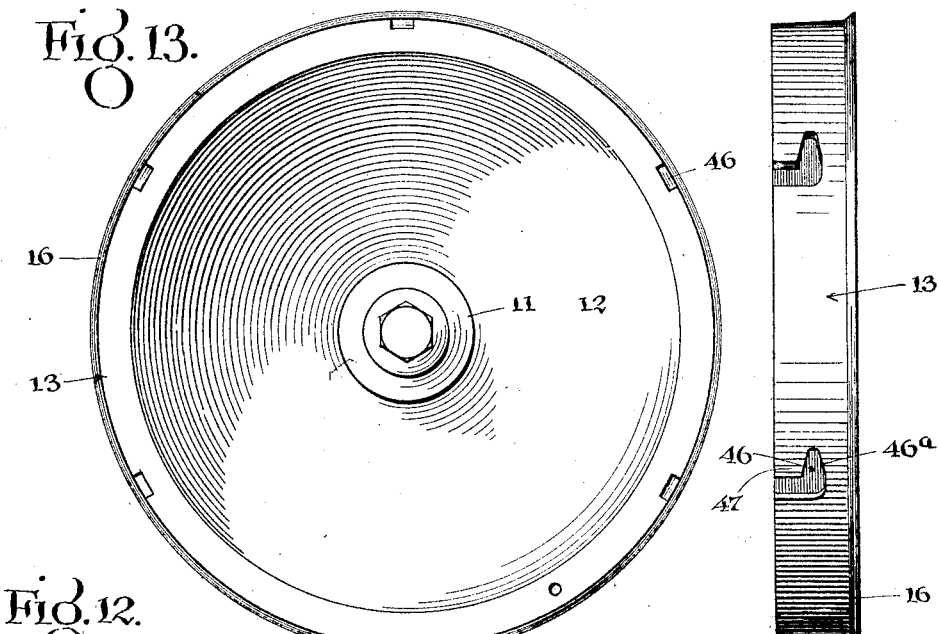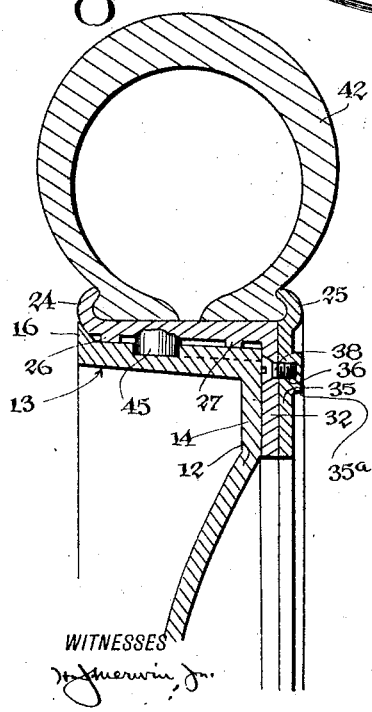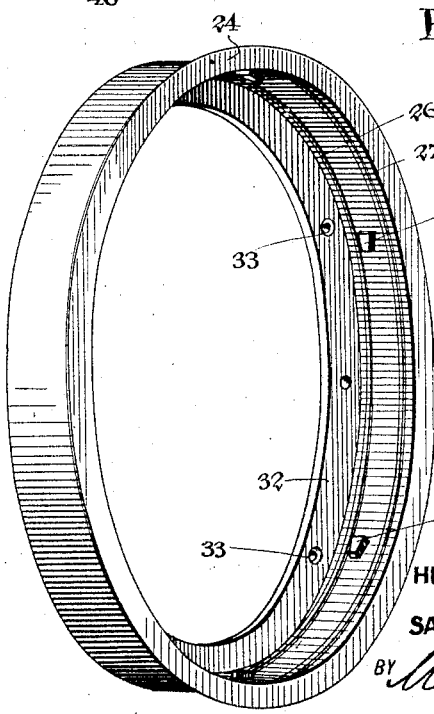

Patented Dec. 25, 1923.

1,478,437

UNITED STATES PATENT OFFICE.

SAMUEL KAPLAN AND HENRY M. HOWELL, OF MONROE, LOUISIANA, ASSIGNORS TO INSTANT CHANGEABLE TIRE RIM CO., INC., OF MONROE, LOUISIANA, A CORPORATION OF LOUISIANA.

WHEEL FOR AUTOMOBILES.

Application filed October 10, 1921. Serial No. 506,766.

*To all whom it may concern:*

Be it known that we, SAMUEL KAPLAN and HENRY M. HOWELL, citizens of the United States, and residents of Monroe, in the parish of Ouachita and State of Louisiana, have invented certain new and useful Improvements in Wheels for Automobiles, of which the following is a specification.

This invention relates in general to an improvement in wheels for automobiles or other vehicles, and more particularly to a demountable rim therefor.

The object of the invention is to provide a demountable rim of this character which is of extremely simple and durable construction, reliable in operation, and easy and inexpensive to manufacture; which may be readily and easily assembled with and disassembled from the wheel and which is itself so constructed and organized as to permit of the removal and replacement of the tire without the necessity of pinching the tire over the tire retaining flange, which is securely locked in assembly on the wheel and which when assembled is positively supported and adapted to effectively withstand lateral as well as radial thrust and all of the strains incident to its use.

Other objects and advantages of the invention reside in certain novel features of construction, combination and arrangement of parts which will be hereinafter more fully described and particularly pointed out in the appended claim, reference being had to the accompanying drawings forming part of this specification, and in which:

Figure 1 is a view in side elevation of the rim and wheel assembly of one embodiment of the invention;

Figure 2 is a view in rear elevation of the demountable rim;

Figure 3 is a view in front elevation of the wheel with the demountable rim removed;

Figure 4 is a view of the wheel in front elevation;

Figure 5 is a view of the wheel in transverse section;

Figure 6 is a similar view of the demountable rim apart from the wheel, the outer tire retaining flange and its locking plate being removed therefrom;

Figure 7 is a similar view of the outer tire retaining flange and its locking plate;

Figure 8 is a view in transverse section of the assembled rim and wheel, on line 8—8 of Figure 1, the tire being shown mounted thereon;

Figure 9 is a view similar to Figure 8, on line 9—9 of Figure 1;

Figure 10 is a view similar to Figures 8 and 9, on line 10—10 of Figure 1;

Figure 11 is a group view in fragmentary perspective of the wheel and rim, parts being omitted for the sake of illustration;

Figure 12 is a view in transverse section of another embodiment of the invention;

Figure 13 is a view in side elevation of the wheel of this embodiment;

Figure 14 is a view in end elevation of the wheel shown in Figure 13;

Figure 15 is a perspective view of the demountable rim employed in this embodiment, parts being omitted for the sake of illustration.

Referring to the drawings wherein for the sake of illustration are shown the preferred embodiments of the invention, it will be seen that the reference character 10 designates generally a wheel. The wheel is shown as being of the disk type but it is obvious that the invention may be embodied in any type of wheel and is well adapted for embodiment in a wire wheel or a wooden wheel, after the manner shown in application, Serial No. 483,923, filed July 11, 1921.

The wheel 10 comprises a hub 11, a web or body portion 12 and a fixed rim or felly 13 which is connected to the web or body portion by an annular flange 14, preferably integral with the fixed rim and the body portion and disposed at right angles to the axis of the wheel.

In the embodiment of the invention shown in Figures 1 to 12, the fixed rim 13 is provided with a circumferential shoulder 16 extending around its inner marginal edge and beveled to constitute an abutment, and adjacent the abutment the rim is provided with an annular seat 17. The periphery or outer surface of the fixed rim or felly is cut away or otherwise formed to provide an annular channel 18 and entering slots or openings 19 which occur intermediate L-shaped locking lugs 20 provided at spaced intervals about the periphery of the fixed rim and integral with or otherwise secured thereto.

A demountable rim, designated generally at 22, is provided and includes a base section 23, an inner fixed tire retaining flange 24 and an outer removable tire retaining flange 25. On the under side of the base section 23 ridges 26 and 27 are provided and in the assembly bear upon the seat 17 and the L-shaped locking lugs 20, respectively.

A plurality of cooperating lock lugs 30 is provided on the under side of the base section of the demountable rim and are adapted to pass through the entering slots or openings 19 and to be rotated into interlocking engagement with the lock lugs 20 of the fixed rim to releasably maintain the demountable rim on the fixed rim or felly of the wheel.

The demountable rim is identical in all embodiments of the invention so that a description with respect to Figures 1 to 11 applies also to the invention as shown in Figures 13 to 15, and includes a locking plate 32 integral with or otherwise secured to the base section 23 of the rim and provided with a plurality, preferably four, countersunk openings 33 extending entirely therethrough, the openings 33 being countersunk at their inner ends which is adjacent the annular flange 14 of the wheel in the assembly. The outer faces of the locking plates 32 are provided with a plurality, preferably four, guide openings 34 which extend only partially through the locking plate.

The outer removable tire retaining flange 25 includes a locking plate 35 cooperable with the locking plate 32 of the base section and having a plurality of threaded sockets 36 adapted to be brought into registry with the countersunk openings 33 of the locking plate 32 in the assembly by means of the coaction of guide studs or pins 37 with the guide openings 34 of the locking plate 32, the guide studs 37 being integrally formed with or otherwise secured to the locking plate 35. The locking plate 35 is provided with a boss 35ª adjacent each of the sockets 36 to give to these sockets and to the locking plate at these points added strength and rigidity. A plurality of fastening devices, such as screws 38, extend through the openings 33 of the locking plate 32 and are engaged with the threaded sockets 36 of the locking plate 35 to releasably secure the outer removable tire retaining flange in position. As the screws 38 are countersunk, their heads are coplanar with the inner face or surface of the locking plate 32 and do not interfere with the proper assembly of the demountable rim on the wheel.

Means is provided for preventing circumferential movement of the demountable rim on the fixed rim or felly of the wheel and comprises a bolt and nut 40 which in the assembly extends through registering openings provided therefor in the annular flange 14 of the wheel and the locking plates 32 and 35.

A tire, designated at 42, is arranged on the demountable rim. The tire may be mounted on the rim and demounted therefrom by simply removing the outer tire retaining flange, and this obviates the necessity of pinching the beads of the tire over the tire retaining flanges. It is obvious that the outer tire retaining flange 25 may be readily removed by taking out the screws 38 which are only four in number and which are readily accessible when the demountable rim is removed from the wheel. When a new tire has been placed on the demountable rim, the tire retaining flange 25 may be readily reassembled with the other elements of the rim as the guide studs 37 which are of any desirable contour or cross section, coact with the guide openings 34 to bring the countersunk openings and the threaded sockets into accurate registration, thus greatly facilitating the insertion and engagement of the screws 38.

The demountable rim may be removed from the fixed rim of the wheel by simply removing the bolt and nut 40 and rotating the demountable rim relative to the fixed rim until the locking lugs 30 of the demountable rim are alined with the entering slots 19 of the fixed rim and then drawing the rim laterally from the wheel. It is to be noted that the L-shaped locking lugs 20 not only coact with each other to interlock or secure the demountable rim in position on the wheel but also act as stop elements to stop the demountable rim when alined with the entering slots or when its lock lugs are fully engaged with the lock lugs of the wheel.

In placing the demountable rim in position on the fixed rim of the wheel its lock lugs 30 are alined with the entering slots of the wheel and are moved laterally through these slots until the lock lugs 30 are circumferentially alined with the lock lugs 20 at which time the demountable rim is rotated relative to the fixed rim so as to bring the lock lugs 30 and the lock lugs 20 into interlocking engagement. The bolt and nut 40 is then inserted and the assembly is complete.

In the embodiment of the invention shown in Figures 13 to 15, the wheel, the fixed rim and the demountable rim are all identical with the corresponding elements of the embodiment shown in Figures 1 to 12, inclusive, except that the interlocking means between the demountable rim and the fixed rim is of a somewhat different form. This interlocking means consists of a plurality of lock lugs 45 integral with or otherwise secured to the under surface or inner periphery of the base section of the demountable rim. The periphery of the fixed rim is not cut away as in the previous embodiment of the invention but is formed solid with the exception of a plurality of L-shaped slots 46 defining lock lugs 47 cooperable with the lock lugs 45 of the demountable rim. The lock lugs 47 are similar in the broad sense to the lock lugs 20 of the other embodiment of the invention and coact with the lock lugs 45 to secure the demountable rim in position on the wheel. As shown in the drawings, one of the lugs of the L-shaped slot 46 is tapered, as at 46ª and the lock lugs 45 are correspondingly tapered with respect to these tapered lugs of the slots 46.

In assembling the demountable rim on the fixed rim with the locking means shown in Figures 13 to 15, the demountable rim is first moved laterally on the fixed rim so as to move the lock lugs 45 into the L-shaped slots 46 and the rim is then moved circumferentially so as to move these lock lugs into the tapered or wedge-shaped lugs 46ª of these L-shaped slots. When removing the rim from the wheel the demountable wheel is reversely moved. The operation of this embodiment of the invention and the action of the demountable rim is in all other respects similar to that of the embodiment in Figures 1 to 12.

We claim:

In a device of the character described, a wheel having a fixed rim provided with a beveled shoulder consituting an abutment and an annular seat, a plurality of spaced L-shaped locking lugs carried by said fixed rim, said fixed rim having entering slots intermediate said locking lugs, a demountable rim having circumferential ridges adapted to rest on the annular seat and the locking lugs of said fixed rim, a plurality of spaced L-shaped locking lugs carried by said fixed rim and adapted to move into said entering slots and into interlocking engagement with the locking lugs of the fixed rim, and means for securing said demountable rim against circumferential movement relative to said fixed rim.

SAMUEL KAPLAN.
HENRY M. HOWELL.